United States Patent
Wang et al.

(10) Patent No.: US 9,182,863 B2
(45) Date of Patent: Nov. 10, 2015

(54) PORTABLE ELECTRONIC DEVICE AND TOUCH CONTROL MODULE THEREOF

(71) Applicant: Wistron Corporation, New Taipei (TW)

(72) Inventors: Kuei-Ching Wang, New Taipei (TW);
Ta-Hu Lin, New Taipei (TW);
Tung-Hsin Liu, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 240 days.

(21) Appl. No.: 13/867,134

(22) Filed: Apr. 22, 2013

(65) Prior Publication Data
US 2013/0285978 A1    Oct. 31, 2013

(30) Foreign Application Priority Data
Apr. 25, 2012 (TW) .............................. 101207720 U

(51) Int. Cl.
*G06F 3/041* (2006.01)
*G06F 3/044* (2006.01)
*G06F 1/16* (2006.01)

(52) U.S. Cl.
CPC .............. *G06F 3/044* (2013.01); *G06F 1/1626* (2013.01); *G06F 1/1637* (2013.01); *G06F 1/1643* (2013.01); *G06F 3/041* (2013.01)

(58) Field of Classification Search
CPC ........... G06F 3/033; G06F 3/02; G06F 3/041; G06F 3/045; G09G 5/08; G09G 5/00
USPC .................................................. 345/173–175
See application file for complete search history.

(56) References Cited

U.S. PATENT DOCUMENTS

| 2011/0148780 | A1* | 6/2011 | Lu et al. | 345/173 |
| 2012/0285810 | A1* | 11/2012 | Wang et al. | 200/512 |
| 2013/0127744 | A1* | 5/2013 | Shakya et al. | 345/173 |
| 2013/0135233 | A1* | 5/2013 | Wang et al. | 345/173 |
| 2013/0257786 | A1* | 10/2013 | Brown et al. | 345/174 |

* cited by examiner

*Primary Examiner* — Pegeman Karimi
(74) *Attorney, Agent, or Firm* — Winston Hsu; Scott Margo

(57) ABSTRACT

A portable electronic device includes a touch control module and a processing module. The touch control module has a substrate, a transparent conductive layer, a conductive decoration pad, a decoration layer and a non-transparent conductive layer. The transparent conductive layer is disposed on the substrate. The conductive decoration pad is disposed on the transparent conductive layer. The decoration layer is disposed on the conductive decoration pad and the transparent conductive layer, and has an opening. The non-transparent conductive layer is disposed on the decoration layer and electrically connected with the transparent conductive layer via the opening. The processing module is electrically connected with the touch control module.

20 Claims, 6 Drawing Sheets

PORTABLE ELECTRONIC DEVICE AND TOUCH CONTROL MODULE THEREOF

BACKGROUND OF THE INVENTION

1. Field of the Invention

The present invention relates to an electronic device, and more particularly, to a portable electronic device.

2. Description of the Prior Art

Various types of touch input technology are widely used in electronic products, especially portable electronic devices, e.g. mobile phones and tablet PCs. A portable electronic device uses a touch panel as an input interface, such that a user may perform touch operations on the touch panel to input commands, e.g. drag a finger to move a cursor or write words on the touch panel. Also, the touch panel may cooperate with a display to show virtual keys for being selected by the user to input characters and words.

In general, touch panels are categorized into resistive, capacitive, ultrasound, and infrared types, wherein the resistive touch panels are the most popular. The resistive touch panels may be further categorized into 4-wire, 5-wire, 6-wire, and 8-wire touch panels, wherein the 4-wire touch panels have been widely manufactured and applied due to consideration of cost and technology maturity. However, the capacitive touch panel can sense a slight touch, which is more convenient, and the capacitive control panel is hardly worn by finger touch, which leads to stable performance, and longer life in comparison with the resistive touch panel. Thus, the capacitive control panel has gradually replaced the resistive control panel.

A touch panel may include a substrate on which a trace layer, an insulation layer and a flexible printing circuit board (FPC) pattern may be formed. The substrate is made of transparent materials, e.g. glass, but bonding materials formed on a border of the substrate are translucent or colored, such that the substrate may not visually hide the insulation layer and the FPC pattern when the user looks at the touch panel from a side view. To improve an appearance of the touch input device, a conventional technology adds an additional frame onto a housing to cover inner elements which are not desired to be seen by the user, i.e. the insulation layer or the FPC patterns. As a result, the housing is hard to get rid of the frame.

More importantly, the touch panel of the conventional portable electronic devices is composed by two substrates, which is hard to comply with the requirement of thin portable electronic devices. Moreover, the touch panel may include a cover lens to protect the inner circuits and elements, which further increases the thickness of the touch panel as well as the thickness of the portable electronic device.

Therefore, how to design an electronic portable device capable of hiding border traces from being seen by users, and removing thickness issue caused by using the double substrates or the cover lens via the substrate structure has become an important topic in the industry.

SUMMARY OF THE INVENTION

It is therefore an object of the present invention to provide a portable electronic device with a full-flat touch panel as well as a touch control module capable of covering up border traces from being seen by users to improve the above mentioned problems.

Besides, another object of the present invention is to provide a novel portable electronic device and a touch control module for removing the thickness issue induced by the necessity of the double substrates or the cover lens through the design of the substrate structure.

To achieve above objects, the present invention includes a touch control module and a processing module. The touch control module includes a substrate, a transparent conductive layer, a conductive decoration pad, a decoration layer and a non-transparent conductive layer, wherein the transparent conductive layer is disposed on the substrate. The conductive decoration pad is disposed on the transparent conductive layer. The decoration layer is disposed on the conductive decoration pad and the transparent conductive layer, and the decoration layer has an opening. The non-transparent conductive layer is disposed on the decoration layer and is electrically connected with the transparent conductive layer via the opening. The processing module is electrically connected with the touch control module.

In an embodiment of present invention, the conductive decoration pad completely covers the opening.

In an embodiment of present invention, the opening is located above the conductive decoration pad.

In an embodiment of present invention, the substrate is a rigid or flexible transparent substrate.

In an embodiment of present invention, the substrate is a transparent plastic substrate, a transparent glass substrate or a polyethylene terephthalate (PET) film-like substrate.

In an embodiment of present invention, the transparent conductive layer defines a touch-sensitive path.

In an embodiment of present invention, the touch control module further includes an insulation layer and a conductive bonding material. The insulation layer is disposed on the non-transparent conductive layer and the conductive bonding material is disposed on the non-transparent conductive layer and adjacent to the insulation layer.

In an embodiment of present invention, the processing module includes a carrier and a processing unit. The carrier has a pin bonding to the conductive bonding material; and the processing unit is disposed on the carrier, and electrically connected with the non-transparent conductive layer.

In an embodiment of present invention, the portable electronic device further includes a display module which is electrically connected with the processing module.

In an embodiment of present invention, the touch control module is an input touch panel or a touch panel.

In an embodiment of present invention, the touch control module is a resistive touch control module or a capacitive touch control module.

In an embodiment of present invention, the portable electronic device is a tablet PC, a laptop, a digital camera, an audio and video playback device, a game console or a mobile communication device.

Followed by the description stated above, the portable electronic devices of the present invention have an opening, which is used to directly or indirectly connect the non-transparent conductive layer and the transparent conductive layer. Also, the opening of the decoration layer is located on the conductive decoration pad above the transparent conductive layer so that the conductive decoration pad and the decoration layer hide traces in an border from being seen by users, but does not require a frame, so as to achieve a full-flat touch panel.

Furthermore, by using the touch control module of the present invention, only a single substrate is required, which removes the requirements of double substrates or transparent bonding or cover lens and facilitates a thin type of the portable electronic device.

These and other objectives of the present invention will no doubt become obvious to those of ordinary skill in the art after

DETAILED DESCRIPTION

Descriptions below refer the related figures to illustrate a portable electronic device according to a preferred embodiment of the present invention, wherein the identical elements are illustrated by the same symbols.

Figure 1:
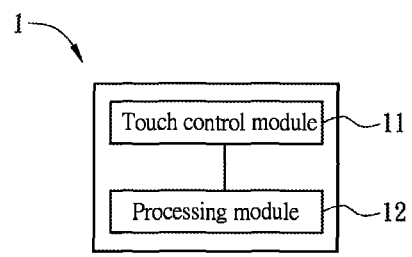
FIG. 1 illustrates a block diagram of a portable electronic device according to the present invention.

Please refer to FIG. 1, which is a block diagram of a portable electronic device 1 according to an embodiment of the present invention. The portable electronic device 1 includes a touch control module 11 and a processing module 12. The touch control module 11 and the processing module 12 are electrically connected. In the embodiment, the portable electronic device 1 may be a tablet PC, a laptop, a digital camera, an audio and video playback device, a game console or a mobile communication device, as shown in FIG. 2A to FIG. 2F. Besides, the portable electronic device 1 may also be a touch keyboard, wherein the touch control module 11 thereof is printed or disposed by a physical pattern in an operation side to visually form into multiple keys. The keys may accompany with the processing module 12 to output specific meanings and functions when receiving touch-controlled actions for users to input messages or commands. Note that, FIG. 2A to FIG. 2F only show at least portion of the touch control module 11 revealed in a housing of the portable electronic device, but does not show the portion of the processing module inside the portable electronic device.

Figure 3A:
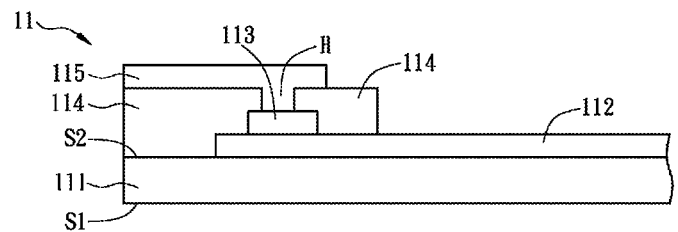
FIG. 3A to FIG. 3C are diagrams of the display module and the processing module of portable electronic devices according to the present invention.
Figure 3B:
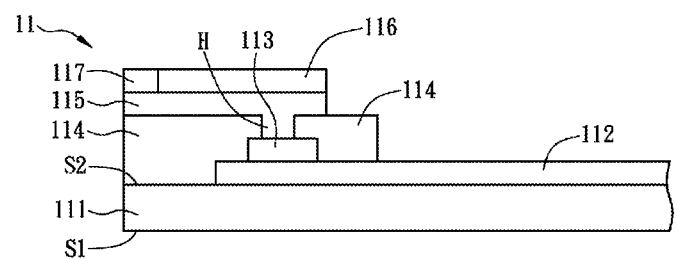
Figure 3C:
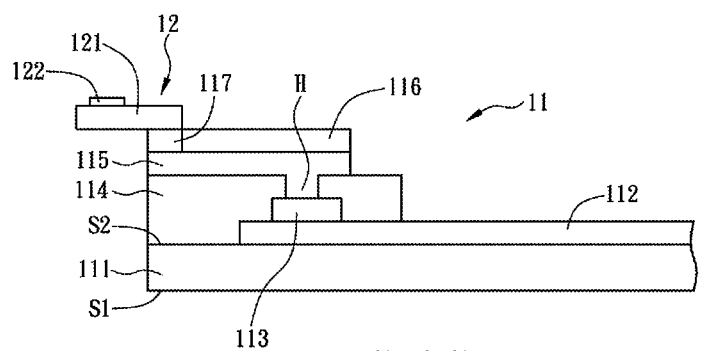

Next, please refer to FIG. 3A to FIG. 3C for further illustration of the preferred embodiments of the portable electronic device. As shown in FIG. 3A, the touch control module 11 includes a substrate 111, a transparent conductive layer 112, a conductive decoration pad 113, a decoration layer 114 and a non-transparent conductive layer 115. The substrate 111 can be a transparent substrate, e.g. a plastic substrate, a glass substrate, or a polyethylene terephthalate (PET) film-like substrate, wherein a flexible transparent substrate is preferred. A user may perform touch operations on an outer surface S1 of the substrate 111 and view the touch control module 11 through the outer surface S1, elements except for the outer surface S1 comprised in the planar touch panel 1 are disposed on a side of the substrate 11 opposite to the outer surface S1, i.e. an inner surface S2.

The transparent conductive layer 112 is disposed on the inner surface S2 of the substrate 111, utilized to define sensing or signal traces, and may be made of indium tin oxide (ITO). In the embodiment, the touch control module 11 has one transparent conductive layer 112, which is an example for illustration but is not limited thereto. In practical applications, a number of the transparent conductive layer 112 may be varied according to dimensions of the substrate 111 and entire circuit design, and a shape of the transparent conductive later 112 may conform to a triangle, a trapezoidal, or a rectangle, which is not limited.

The conductive decoration pad 113 is disposed on the transparent conductive layer 112, while the decoration layer 114 has an opening H and is disposed on the transparent conductive layer 112 and the conductive decoration pad 113. A shape and a color of the conductive decoration pad 113 may be arbitrary. However, in a preferred embodiment, the color of the conductive decoration pad 113 may be selected to be a color similar to or the same as that of the decoration layer 114. Therefore, when the user looks into the touch control module 11 through the outer surface S1 of the substrate 111, the user is not aware of the difference between the conductive decoration pad 113 and the decoration layer 114. In implementation, the conductive decoration pad 113 maybe made of carbon, nano-copper, nano-silver, polymer conductive resin, etc., but is not limited thereto. The decoration layer 114 maybe made of a variety of colored inks with insulator, but is not limited thereto.

The non-transparent conductive layer 115 is disposed on the decoration layer 114, and at least a portion of the non-transparent conductive layer 115 is disposed within the opening H and is electrically connected to the conductive decoration pad 113 through the opening H. The opening H is located on the conductive decoration pad 113, and the conductive decoration pad 113 fully covers the opening H. Therefore, even if the opening H is not filled with the material of the non-transparent conductive layer 115, causing a part of the opening H to be empty, the user may not be aware of the opening H, such that position misalignment during disposing of the non-transparent conductive layer 115 is compensated. Certainly, under a preferred condition, the opening H should be filled with the material of the non-transparent conductive layer 115. The non-transparent conductive layer 115 may be made of silver adhesive, by which a fine circuitry can be defined on the decoration layer 114 through a screen printing equipment collaborated with a silk screen.

As shown in FIG. 3B, the touch control module 11 further includes an insulation layer 116 and a conductive bonding material 117. The insulation layer 116 is disposed on the non-transparent conductive layer 115. The conductive bonding material 117 is disposed on the non-transparent conductive layer 115 and adjacent to the insulation layer 116. For example, the insulation layer 116 may cover the non-transparent conductive layer 115 by screen printing to protect the non-transparent conductive layer 115 from oxidation caused by exposure to the air. Besides, the conductive bonding material 117 may be an anisotropic conductive film (ACF) or an anisotropic conductive paste (ACP).

Next, please refer to FIG. 3C. The processing module 12 includes a carrier 121 and a processing unit 122. The carrier 121 has a pin, and the carrier 121 bonds the conductive bonding material 117 of the touch control module 11 via the pin to fix the carrier 121 on the non-transparent conductive layer 115 and near the insulation layer 116. The above-mentioned carrier 121 is preferably a flexible printing circuit board (FPC). The processing unit 122 is disposed on the carrier 121, and is electrically connected with the non-transparent conductive layer 115 via the pin. In detail, the processing unit 122 receives touch-controlled signals from the transparent conductive layer 112 through the pin, the conductive bonding material 117, the non-transparent conductive layer 115, and the conductive decoration pad 113 for computation and/or comparison thereafter in order to execute the operation or function accordingly.

Figure 4:
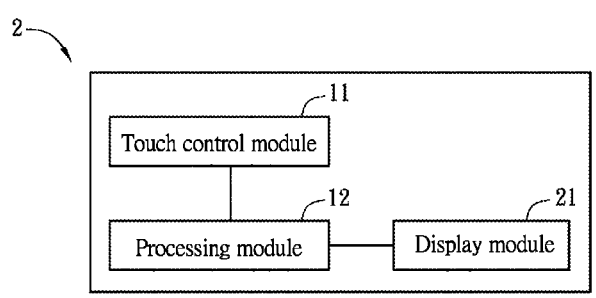
FIG. 4 illustrates a block diagram of an alternative portable electronic device according to the present invention.

Please refer to FIG. 4, which is a portable electronic device 2 according to another preferred embodiment of the present invention. The difference between the portable electronic device 2 and the portable electronic device 1 is that the portable electronic device 2 further includes a display module 21. The display module 21 is electrically connected with the processing module 12, and the display module 21 displays pictures according to output signals of the processing module 12. Note that, the display module 21 and the touch control module 11 may vertically overlap, which may be applied to the tablet PC, digital camera, video and audio playback, game console, and the mobile communication device, as shown in FIGS. 2A, and 2C-2F. In other words, the touch control module 11 is taken as a touch panel, and collaborates with the display module 21 to construct a touch-controlled display panel.

Figure 2A:
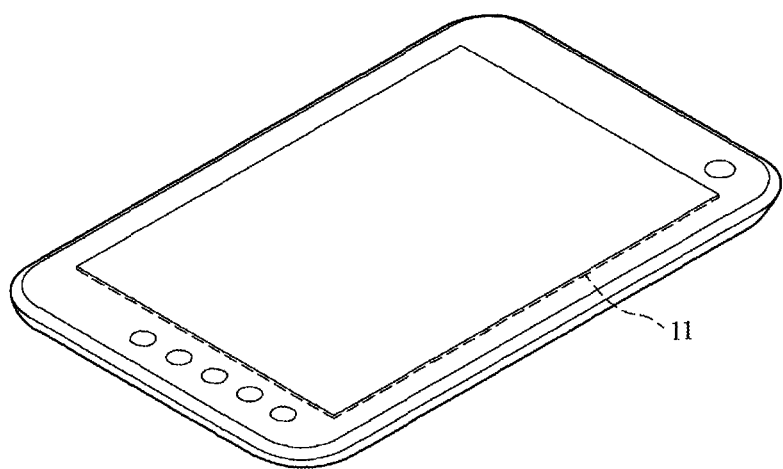
FIG. 2A to FIG. 2F are diagrams of portable electronic devices according to variety of embodiments of the present invention.
Figure 2B:
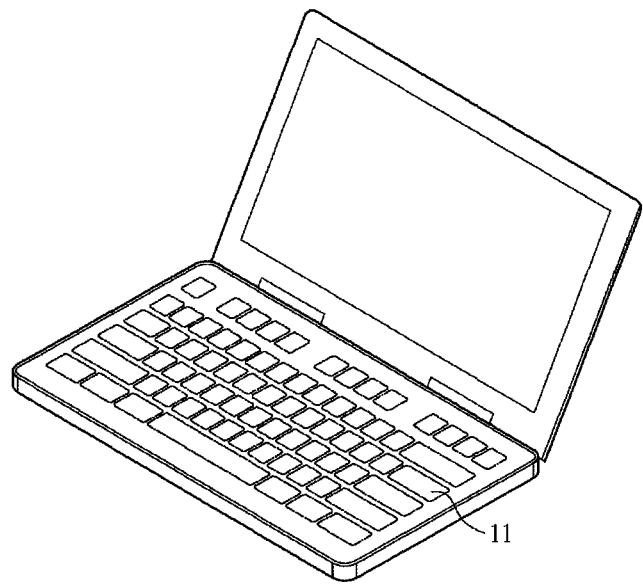
Figure 2C:
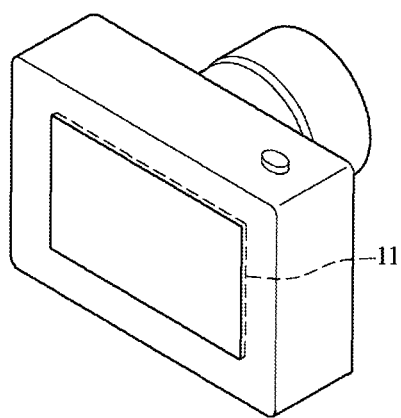
Figure 2D:
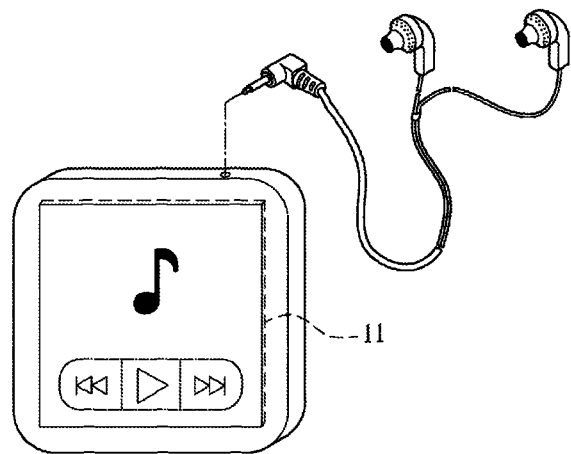
Figure 2E:
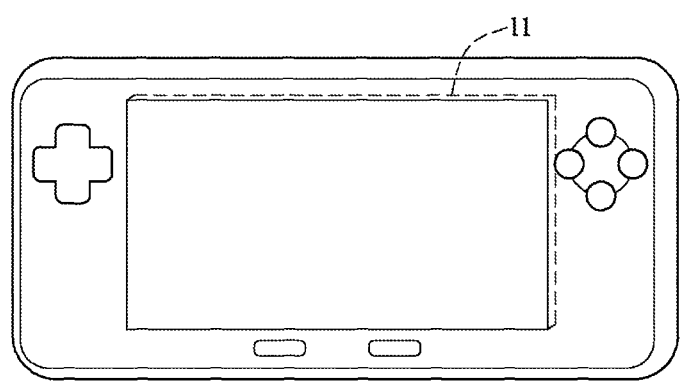
Figure 2F:
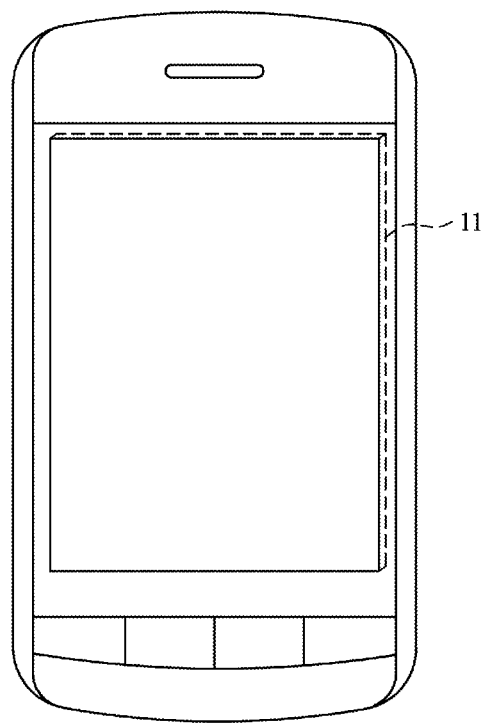

Alternatively, the display module 21 and the touch control module 11 may be separately disposed, e.g. the laptop shown in FIG. 2B. In this embodiment, the touch control module 11 is an input touch panel including multiple input units, and each input unit represents at least a respective key that has a specific meaning and function for the user to input messages or commands.

In sum, in the portable electronic device of present invention, the opening provides a direct or indirect electrical connection between the non-transparent conductive layer and the transparent conductive layer, and the opening of the decoration layer is located above the conductive decoration pad of the transparent conductive layer. Therefore, the conductive decoration pad and the decoration layer are capable of hiding traces in the border of the portable electronic device from being seen by the user. Besides, the present invention does not require a frame, and thus a full-flat touch panel is achieved.

Furthermore, by using the touch control module, the present invention may include only a single substrate and get rid of the requirement of double substrates, transparent bonding or cover lens, which achieves a thin portable electronic device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A portable electronic device, comprising:
a touch control module, comprising:
 a substrate;
 a transparent conductive layer, wherein the transparent conductive layer is disposed on the substrate;
 a conductive decoration pad, wherein the conductive decoration pad is disposed on the transparent conductive layer;
 a decoration layer, wherein the decoration layer is disposed on the conductive decoration pad and the transparent conductive layer, and the decoration layer has an opening; and
 a non-transparent conductive layer, wherein the non-transparent conductive layer is disposed on the decoration layer, and is electrically connected with the transparent conductive layer via the opening; and
a processing module, electrically connected with the touch control module.

2. The portable electronic device of claim 1, wherein the conductive decoration pad completely covers the opening.

3. The portable electronic device of claim 1, wherein the opening is located above the conductive decoration pad.

4. The portable electronic device of claim 1, wherein the substrate is a rigid or flexible transparent substrate.

5. The portable electronic device of claim 1, wherein the substrate is a transparent plastic substrate, a transparent glass substrate or a polyethylene terephthalate (PET) film-like substrate.

6. The portable electronic device of claim 1, wherein the transparent conductive layer defines a touch-sensitive path.

7. The portable electronic device of claim 1, wherein the touch control module further comprises:
an insulation layer, disposed on the non-transparent conductive layer; and
a conductive bonding material, disposed on the non-transparent conductive layer and adjacent to the insulation layer.

8. The portable electronic device of claim 7, wherein the processing module comprises:
a carrier, having a pin bonding to the conductive bonding material; and
a processing unit, disposed on the carrier, and electrically connected with the non-transparent conductive layer.

9. The portable electronic device of claim 1, further comprising:
a display module, electrically connected with the processing module.

10. The portable electronic device of claim 1, wherein the touch control module is a touch pad or a touch panel.

11. The portable electronic device of claim 1, wherein the touch control module is a resistive touch control module or a capacitive touch control module.

12. The portable electronic device of claim 1, being a tablet PC, a laptop, a digital camera, an audio and video playback device, a game console or a mobile communication device.

13. A touch control module for a portable electronic device, comprising:
a substrate;
a transparent conductive layer, wherein the transparent conductive layer is disposed on the substrate;
a conductive decoration pad, wherein the conductive decoration pad is disposed on the transparent conductive layer;
a decoration layer, wherein the decoration layer is disposed on the conductive decoration pad and the transparent conductive layer, and the decoration layer has an opening; and
a non-transparent conductive layer, wherein the non-transparent conductive layer is disposed on the decoration layer, and is electrically connected with the transparent conductive layer via the opening.

14. The touch control module of claim 13, wherein the conductive decoration pad completely covers the opening.

15. The touch control module of claim 13, wherein the opening is located above the conductive decoration pad.

16. The touch control module of claim 13, wherein the transparent conductive layer defines a touch-sensitive path.

17. The touch control module of claim 13, wherein the touch control module further comprises:
an insulation layer, disposed on the non-transparent conductive layer; and
a conductive bonding material, disposed on the non-transparent conductive layer and adjacent to the insulation layer.

18. The touch control module of claim 13, wherein the substrate is a rigid or flexible transparent substrate.

19. The touch control module of claim 13, wherein the substrate is a transparent plastic substrate, a transparent glass substrate or a polyethylene terephthalate (PET) film-like substrate.

20. The touch control module of claim 13, wherein the touch control module is a touch pad or a touch panel.

\* \* \* \* \*